United States Patent [19]

May, Jr.

[11] 3,973,086

[45] Aug. 3, 1976

[54] DIGITAL ECHO SUPPRESSOR BREAK-IN CIRCUITRY

[75] Inventor: Carl Jerome May, Jr., Holmdel, N.J.

[73] Assignee: Bell Telephone Laboratories, Incorporated, Murray Hill, N.J.

[22] Filed: Apr. 24, 1975

[21] Appl. No.: 571,056

[52] U.S. Cl............................ 179/170.2; 179/170.6; 179/170.8
[51] Int. Cl.² .......................................... H04B 3/20
[58] Field of Search............ 179/170.2, 170.6, 170.8

[56] References Cited
UNITED STATES PATENTS

| | | | |
|---|---|---|---|
| 3,305,646 | 2/1967 | Brady et al. ..................... | 179/170.6 |
| 3,313,893 | 4/1967 | Helder............................. | 179/170.6 |
| 3,560,669 | 2/1971 | Foulkes et al. .................. | 179/170.6 |
| 3,673,355 | 6/1972 | LaMarche et al. .............. | 179/170.6 |
| 3,896,273 | 7/1975 | Fariello........................... | 179/170.6 |
| 3,906,172 | 9/1975 | Hoeschele, Jr. et al. ........ | 179/170.6 |

Primary Examiner—Kathleen H. Claffy
Assistant Examiner—Randall P. Myers
Attorney, Agent, or Firm—Donnie E. Snedeker

[57] ABSTRACT

During echo suppression in a system utilizing a split echo suppressor, suppression is removed when the near-end party breaks in (i.e., during double talking) and is typically replaced with a small fixed loss inserted in the receive line. To minimize loud echoes without unduly penalizing soft talkers at the far end, the loss inserted in the receive line can be varied advantageously according to the incoming signal level by using a compression circuit. The present disclosure relates to a simple arrangement for providing instantaneous compression loss in a digital system by modifying the incoming encoded signal in a predetermined manner. In an illustrative embodiment, one-half the value of the input signal is added to one-half of a selected value when the input signal level equals or exceeds the selected value.

11 Claims, 2 Drawing Figures

DIGITAL ECHO SUPPRESSOR BREAK-IN CIRCUITRY

BACKGROUND OF THE INVENTION

This invention relates to echo suppressors for two-way transmission systems and, more particularly, to improved digital break-in circuitry for such echo suppressors.

Echoes are produced in a transmission system whenever an impedance discontinuity or mismatch exists, such as at the junction between a four-wire transmission facility and a two-wire transmission facility. The annoying effects of echoes can be minimized by the use of echo suppressor apparatus which essentially operates to disable the echo path of a subscriber when he is transmitting. Thus, basically, an echo suppressor is a voice-operated switching device which may be situated near one end of a four-wire transmission facility. If echoes in both directions are to be suppressed by the device, it is commonly referred to as a full echo suppressor; if echoes are suppressed in only one direction, the device is referred to as a split echo suppressor.

In a split echo suppressor, the echo suppressor apparatus nearest a particular subscriber end typically functions to disable the outgoing, or echo return, path from that subscriber when signals from the far-end subscriber appear on the incoming path. Thus, echoes due to incoming signals are prevented from returning to the far-end subscriber. Echo suppressor apparatus at the far subscriber end functions in a similar manner to prevent echoes from returning to the near-end subscriber when the near-end subscriber is transmitting.

During echo suppression in a system utilizing a split echo suppressor, suppression is removed from the outgoing path when the near-end subscriber breaks in, a condition commonly referred to as "double talking" since both subscribers are talking simultaneously. At the same time, the circuitry for effecting such break-in typically inserts a small fixed loss, on the order of 6–10 db, in the incoming path to reduce the level of echoes thereon during double talking. Unfortunately, the reduction of echoes using fixed losses in this manner is accompanied by a corresponding reduction in the level of speech signals received from the far-end subscriber and his message may become unintelligible, particularly if he speaks softly. Solutions to this problem in analog echo suppressor systems have been proposed using syllabic speech compressor and variolosser arrangements for providing a variable double-talking loss, as disclosed in P. T. Brady-G. K. Helder U.S. Pat. No. 3,305,646, issued Feb. 21, 1967 and G. K. Helder U.S. Pat. No. 3,313,893, issued Apr. 11, 1967.

In digital echo suppressors, voice and echo signals appear as digitally encoded words. A fixed loss may be provided during double talking, with the attendant limitations mentioned above, via connection of digital attenuator circuitry into the incoming path, as shown in R. E. LaMarche-C. J. May, Jr. U.S. Pat. No. 3,673,355, issued June 27, 1972. Alternatively, a digital implementation of a syllabic speech compressor might be employed in the manner of the above-mentioned Brady and Helder arrangements. However, straightforward implementation of a digital syllabic compressor for this purpose suffers from manifest disadvantages related to cost, speed and complexity.

SUMMARY OF THE INVENTION

It is therefore a primary object of the present invention to improve the break-in performance of digital echo suppressors.

A more specific object is to provide a simple and inexpensive digital break-in arrangement for providing variable loss during double talking which alleviates the limitations and disadvantages of known arrangements.

In a digital split echo suppressor according to my invention, break-in circuitry is responsive to the presence of outgoing communications signals during echo suppression for removing the suppression loss from the outgoing path and for inserting a variable double-talking loss in the incoming path. The variable loss is provided by a digital compression circuit which is selectively switched into the incoming path. The compression circuit modifies the incoming encoded signal in a predetermined manner to effectively insert different magnitudes of loss according to the level of the incoming signal. In a specific illustrative embodiment, one-half the value of the input signal is added to one-half of a selected value when the input signal level equals or exceeds the selected value. Below the selected value, the incoming signal is extended unaltered to the near-end subscriber. The selected value is chosen advantageously so as to minimize loud echoes without unduly penalizing soft talkers.

BRIEF DESCRIPTION OF THE DRAWING

The above and other objects and features of the invention may be fully apprehended from the following detailed description and the accompanying drawing in which.

DETAILED DESCRIPTION

Figure 1:
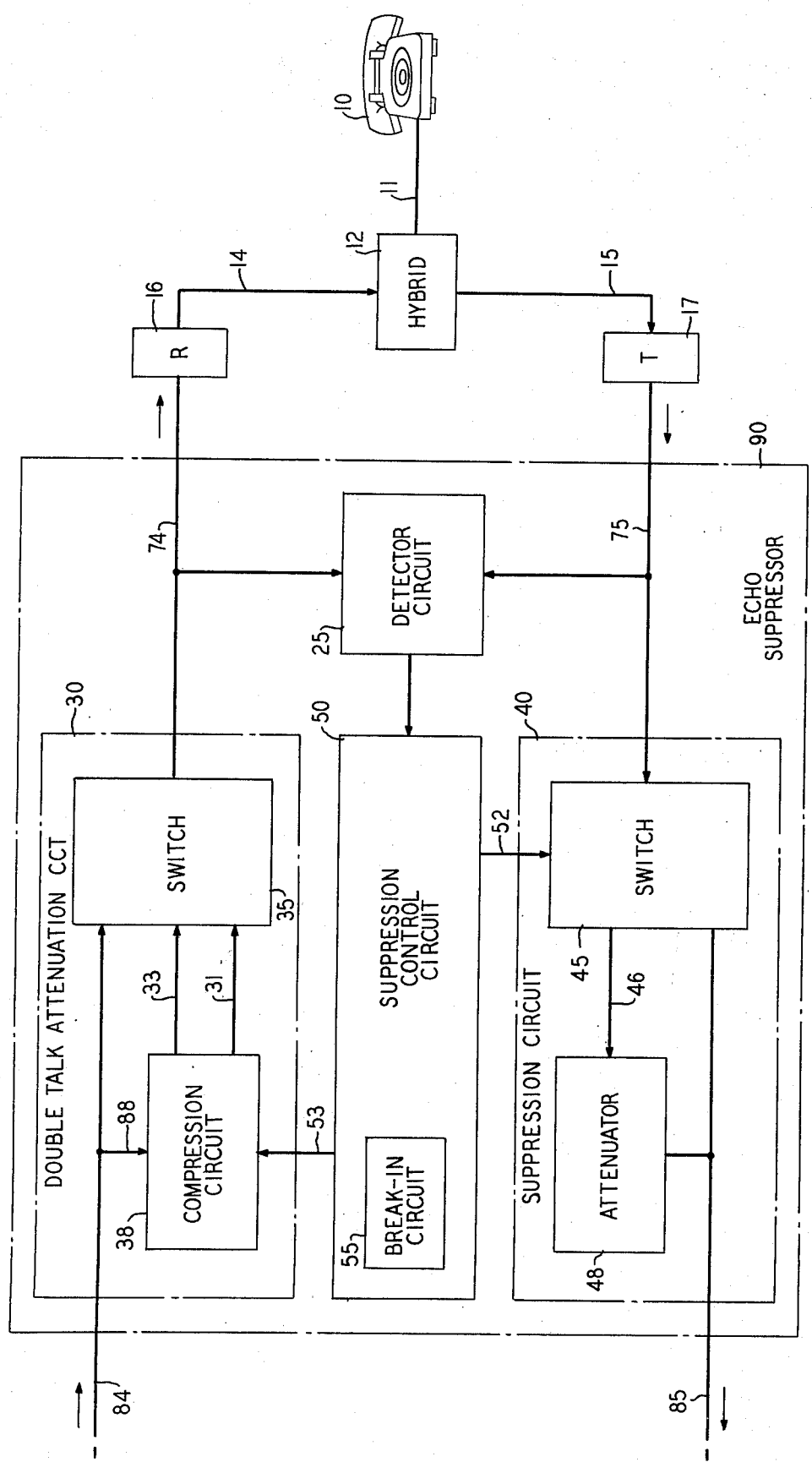
FIG. 1 is a functional block diagram of an illustrative split echo suppressor embodiment in accordance with the invention.

The block diagram in FIG. 1 depicts a typical transmission system in which an echo suppressor in accordance with my invention may be employed; namely, a two-way transmission system including a four-wire transmission facility and a two-wire transmission facility. Subscriber terminal 10, referred to herein as the near-end subscriber, is connected to the four-wire facility by two-wire, two-way circuit 11 and hybrid network or its equivalent 12. Extending from hybrid 12 are a pair of one-way transmission paths 14 and 15 associated respectively with receiver 16 and transmitter 17. The four-wire transmission facility, depicted as a pair of two-wire paths, may comprise a pair of carrier channels, a pair of one-way radio paths or other one-way transmission channels for interconnecting subscriber terminals. Digital transmission is assumed over the four-wire facility, and thus receiver 16 and transmitter 17 function in the usual fashion for converting between analog signals on the two-wire facility and corresponding digital code words on the four-wire facility. Furthermore, as is well known, receiver 16 and transmitter 17 may comprise parallel-to-serial and serial-to-parallel conversion circuitry, if desired for a particular facility, or such conversion circuitry may be included within echo suppressor 90. Similar circuitry may be included also in incoming and outgoing paths 84 and 85.

Echo suppressor 90, connected in circuit with the four-wire transmission facility, is commonly referred to as a split echo suppressor since it operates to suppress echoes in only one direction over the facility. A similar echo suppressor (not shown) is located at the far subscriber end for suppressing echoes in the other direction over the transmission facility. A variety of echo suppressor arrangements for providing echo suppression, break-in and double-talking attenuation, as depicted in the block diagram of FIG. 1, are well known and described in detail in the art. See, for example, the above-identified LaMarche-May patent. Consequently, the description of these arrangements herein will be limited to that believed necessary for a complete understanding of the present invention.

Echo suppressor 90 comprises detector circuit 25, suppression control circuit 50 and suppression circuit 40 for interrupting or disabling speech transmission over outgoing path 85 when signals from the far end appear on incoming path 84, thereby preventing echoes due to incoming signals on path 84 from returning to the far-end subscriber terminal over path 85. The echo suppressor at the far end functions similarly to prevent echoes from returning on path 84 when near-end subscriber 10 is transmitting over outgoing path 85.

In common with prior art echo suppressors, detector circuit 25 examines the incoming signals and outgoing signals to determine when near-end subscriber 10 is transmitting, when the far-end subscriber is transmitting and when both subscribers are transmitting. Based on this determination, detector circuit 25 directs a corresponding indication to suppression control circuit 50 which takes appropriate action. If the far-end subscriber is determined to be transmitting and near-end subscriber 10 is not, for example, control circuit 50 disables speech transmission over outgoing path 85 by extending a suppression enabling signal over path 52 to suppression circuit 40.

In the absence of suppression, outgoing signals on paths 15 and 75 are extended through switch 45 directly to outgoing path 85. Responsive to the suppression enabling signal on path 52, however, switch 45 operates to extend the signals on path 75 instead over path 46 through attenuator 48 to outgoing path 85. Attenuator 48 effectively disables speech transmission over outgoing path 85 by digitally attenuating signals on path 75 to a level below the threshold of hearing.

During echo suppression, i.e., while speech transmission over path 85 is disabled to suppress echoes, near-end subscriber 10 may start transmitting. Simultaneous transmission in both directions is permitted, of course, and is effected by operation of break-in circuit 55 in suppression control circuit 50. When subscriber 10 starts transmitting, detector circuit 25 indicates to suppression control circuit 50 that both subscribers are transmitting, i.e., that a double-talking situation exists. Break-in circuit 55 in control circuit 50 responds by causing the suppression enabling signal to be removed from path 52, thereby reestablishing the direct outgoing signal path through switch 45 from path 75 to path 85. At the same time, break-in circuit 55 causes an enabling signal to be extended over path 53 to double-talk attenuation circuit 30. Attenuation circuit 30 is provided to help reduce echoes in the situation where both parties are talking to one another simultaneously and normal echo suppression cannot be used. In most known echo suppressor arrangements, such as that disclosed in the above-mentioned LaMarche-May patent, a small fixed loss on the order of 6–10 db is inserted in the incoming path for this purpose during double talking. The disadvantages of such arrangements are discussed above.

In accordance with the present invention, however, double-talk attenuation circuit 30 operates to provide a loss in circuit with incoming path 84 which varies with the level of the incoming signals. The variable loss is provided by digital compression circuit 38 which is selectively switched into the incoming path via switch 35. More particularly, responsive to the enabling signal on path 53, compression circuit 38 operates to compress the level of the incoming signals on path 84 in a predetermined manner and to extend the compressed signals over path 33 to switch 35. Switch 35 normally extends incoming signals on path 84 directly therethrough to path 74. During double talking, under control of a selection signal from compression circuit 38 on path 31, switch 35 is operated to extend instead the compressed signals on path 33 through switch 35 to path 74.

Figure 2:
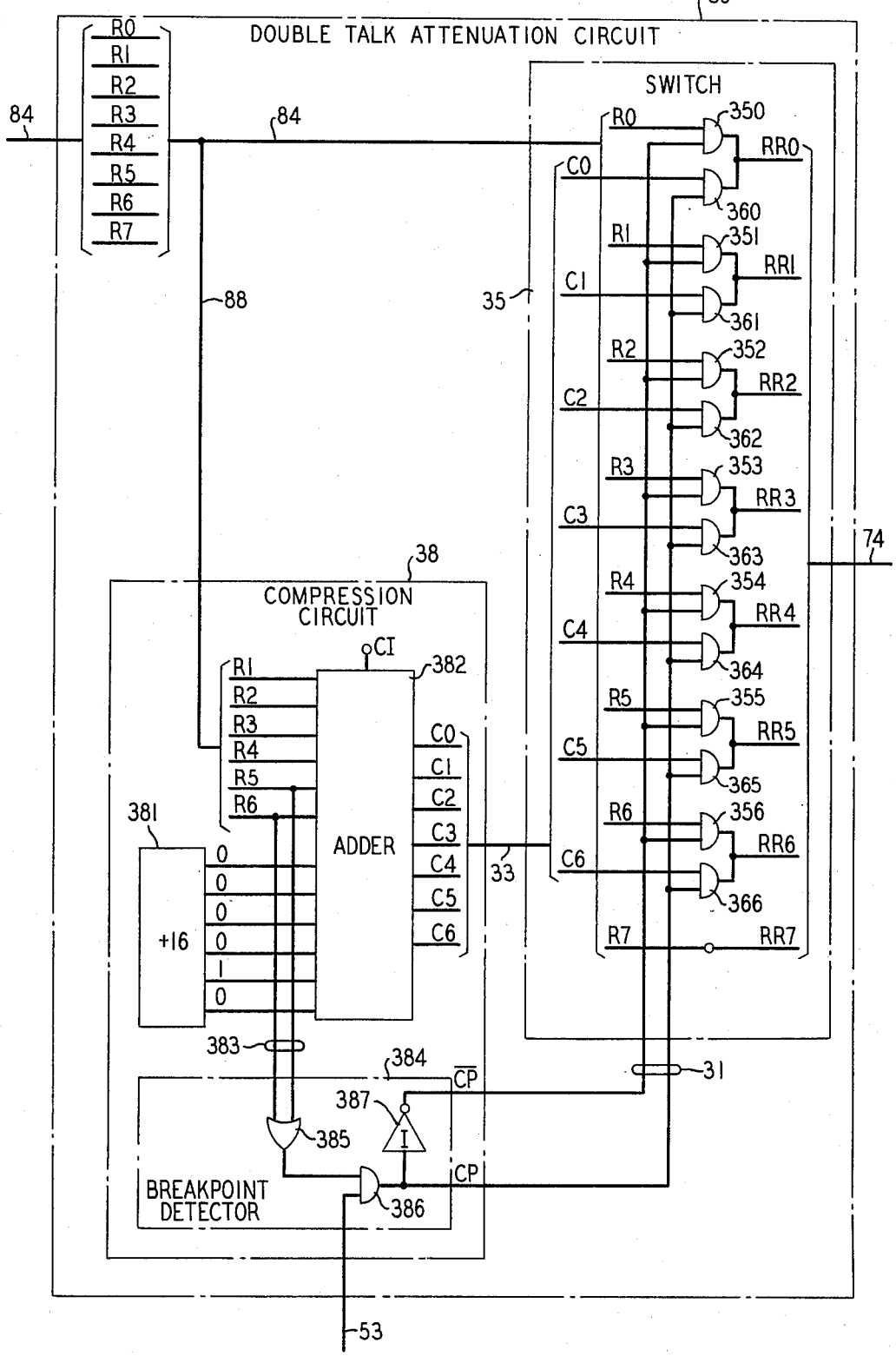
FIG. 2 shows the double-talk attenuation circuit of FIG. 1 in greater detail.

An illustrative embodiment of double-talk attenuation circuit 30 is shown in greater detail in FIG. 2. For purposes of describing the illustrative embodiment, digitally encoded speech and echo signals on incoming path 84 are assumed to comprise code words each having eight bits R0–R7. One such code in common use is a companded sign magnitude code used in pulse code modulation speech transmission systems. Each eight-bit companded sign magnitude code word would include a sign bit R7, segment or chord bits R4–R6, and position or linear bits R0–R3. Sign bit R7 thus indicates the polarity of the encoded analog signal sample and bits R0–R6 indicate the magnitude thereof.

Bits R0–R6 on path 84 are extended to one input of respective gates 350–356 in switch 35, and bits R1–R6 are extended also over path 88 to compression circuit 38. The other input of each of gates 350–356 is connected in common over path 31 to lead $\overline{CP}$ from compression circuit 38. Gates 350–356 are enabled by a selection signal on lead $\overline{CP}$ to extend code word bits R0–R6 directly therethrough on leads RR0–RR6 to path 74.

Switch 35 also includes a second plurality of gates 360–366, one input each of which is connected in common over path 31 to lead CP from compression circuit 38. Bits C0–C6 of compressed code words extended from compression circuit 38 over path 33 are connected to the other input of respective gates 360–366. Gates 360–366 are enabled by a selection signal on lead CP to extend the compressed code word bits C0–C6 therethrough on leads RR0–RR6 to path 74.

Bit R7, the code word sign bit, is always extended directly over lead RR7 to path 74 since the polarity remains unchanged for the compressed and uncompressed code words.

In the illustrative embodiment of FIG. 2, a compressed code word is generated by adding one-half the magnitude of the input signal to one-half of a selected value when the input signal magnitude equals or exceeds the selected value. If the incoming signal magnitude is less than the selected value, it is extended in uncompressed form through switch 35 to path 74. Compression circuit 38 thus comprises a simple and inexpensive arrangement including break point detector 384 for determining when the incoming signal magnitude equals or exceeds the selected value and adder 382 for performing the addition. The selected value, illustratively "32", is chosen so as to minimize loud echoes without unduly penalizing soft talkers.

Break point detector 384 need only monitor bits R5 and R6 over path 383 to determine whether the input signal magnitude exceeds the illustrative selected value of 32. If either bit R5 or R6 is a binary one, then the incoming signal magnitude is equal to or greater than 32, regardless of the binary values of bits R0–R4, and a "compress" signal is provided through gate 385 to one input of gate 386. The other input of gate 386 is connected to path 53, over which an enabling signal is extended from control circuit 50 for break-in in the manner described above. When gate 386 is enabled, the compress signal is extended therethrough on lead CP to enable switch gates 360–366. When gate 386 is disabled, either due to the absence of a compress signal from gate 385 or due to the absence of an enabling signal on path 53, a signal appears through inverter 387 on lead CP to enable switch gates 350–356.

As mentioned above, adder 382 operates to add one-half the incoming signal magnitude to one-half the selected value 32. One-half the selected value, i.e., 16, is provided to adder 382 by circuit 381. One-half the incoming signal is provided to adder 382 by effectively shifting the incoming signal bits one position lower. Thus, bit R1 becomes the least significant bit, bit R2 becomes the next-to-least significant bit and so forth, with bit R0 being dropped. Alternatively, if desired, the least significant incoming signal bit R0 can be connected to the carry input CI of adder 382 to add bit R0 to the value of the compressed code word. The addition in either event results in a seven-bit output code word (bits C0–C6) on path 33 which is a compressed version of the incoming signal magnitude on path 84.

The illustrative double-talk attenuator arrangement depicted in FIG. 2 and described above thus effectively provides different incoming signal loss for different incoming signal levels in a simple and efficient manner by modifying the incoming encoded signals. Although only two different ranges of incoming signal magnitudes (encoded as 0–31 and 32 or greater) are contemplated in the illustrative embodiment, it will be appreciated that any number of such incoming signal ranges may be provided with different losses, if desired, via additional break point detectors and additional circuitry for modifying the incoming signals differently in each range. For example, different values could be provided by circuit 381, or different portions of the incoming signal magnitude (e.g., one-quarter, one-eighth, etc.) could be provided to adder 382 for different incoming signal ranges. Numerous and varied other arrangements may be derived by those skilled in the art without departing from the spirit and scope of the invention.

What is claimed is:

1. In a digital arrangement for suppressing echoes in a two-way communications system having incoming and outgoing paths; means responsive to incoming communications signals for inserting a suppression loss in said outgoing path; and break-in means responsive to outgoing communications signals for removing said suppression loss and for inserting a compression loss in said incoming path; said compression loss inserting means comprising means for detecting when said incoming signals equal or exceed a selected value, means for modifying said incoming signals to generate compressed signals, and means responsive to said detecting means for blocking said incoming signals when said incoming signals equal or exceed said selected value and for extending said compressed signals to said incoming path.

2. An arrangement according to claim 1 wherein said modifying means comprises means for adding a portion of said selected value to a portion of the value of said incoming signals to generate said compressed signals.

3. An arrangement according to claim 1 wherein said modifying means comprises means for adding one-half said selected value to one-half the value of said incoming signals to generate said compressed signals.

4. An arrangement according to claim 3 wherein said adding means comprises an adder, means for providing to said adder a first signal corresponding to one-half said selected value, means for providing to said adder a second signal derived from said incoming signals and corresponding to one-half the value thereof, and means connecting the output of said adder to said extending means.

5. A digital compression circuit for providing communications signal path loss in an echo suppressor during periods of double talking comprising, means for receiving incoming communications signals, means for defining a plurality of ranges of incoming communications signal magnitudes, and means for digitally modifying said incoming communications signals to provide different signal losses for each of said plurality of incoming signal ranges.

6. A compression circuit according to claim 5 wherein said modifying means includes means responsive to said incoming communications signals and to said defining means for generating outgoing communications signals corresponding in magnitude to the sum of a fixed value and a predetermined fraction of the magnitude of said incoming communications signals.

7. A compression circuit according to claim 6 wherein said fixed value is determined by a signal magnitude separating adjacent ones of said plurality of incoming signal ranges.

8. A compression circuit according to claim 5 wherein said incoming communications signals comprise encoded multibit representations wherein said defining means comprises means for detecting an encoded representation of a signal magnitude separating adjacent ones of said plurality of incoming signal ranges, and wherein said modifying means comprises means for modifying the bits of said encoded representations according to the particular one of said ranges within which said incoming signal magnitude is included.

9. A compression circuit according to claim 5 wherein said incoming communications signals comprise encoded multibit representations, and wherein said modifying means comprises means for combining a fixed value and selected bits of each said encoded representation.

10. A compression circuit according to claim 9 wherein said multibit representations are encoded in a companded sign magnitude code and wherein said combining means includes means for adding said fixed value to said selected bits of each said encoded representation, said selected bits comprising a pattern of bits corresponding to a predetermined fraction of the magnitude of each said encoded representation.

11. A compression circuit according to claim 10 further comprising means responsive to the sign bit of each said encoded representation and to said combining means for providing outgoing communications signals.

* * * * *